(12) United States Patent
Iwaki et al.

(10) Patent No.: US 7,584,158 B2
(45) Date of Patent: Sep. 1, 2009

(54) USER SUPPORT APPARATUS

(75) Inventors: Hidekazu Iwaki, Hachioji (JP); Akio Kosaka, Hachioji (JP); Takashi Miyoshi, Atsugi (JP)

(73) Assignee: Olympuc Corporation, Tokyo (JP)

( * ) Notice: Subject to any disclaimer, the term of this patent is extended or adjusted under 35 U.S.C. 154(b) by 0 days.

(21) Appl. No.: 11/134,763

(22) Filed: May 19, 2005

(65) Prior Publication Data

US 2005/0259035 A1    Nov. 24, 2005

(30) Foreign Application Priority Data

May 21, 2004   (JP) ............................. 2004-151734

(51) Int. Cl.
*G06F 17/00* (2006.01)
*G06N 5/00* (2006.01)

(52) U.S. Cl. ...................................... 706/45

(58) Field of Classification Search ................ 345/419, 345/595, 637, 158; 706/20, 46, 18, 60, 23, 706/16, 14; 715/764, 765, 734; 700/13, 700/277, 12, 19
See application file for complete search history.

(56) References Cited

U.S. PATENT DOCUMENTS

| | | | | |
|---|---|---|---|---|
| 6,057,764 | A * | 5/2000 | Williams | ................. 340/572.1 |
| 2002/0158599 | A1 * | 10/2002 | Fujita et al. | ............. 318/568.11 |
| 2003/0043268 | A1 * | 3/2003 | Mann | ......................... 348/143 |
| 2003/0130016 | A1 * | 7/2003 | Matsuura et al. | ............. 455/569 |
| 2003/0172002 | A1 * | 9/2003 | Spira et al. | ..................... 705/27 |
| 2004/0006566 | A1 * | 1/2004 | Taylor et al. | ................. 707/100 |
| 2004/0103296 | A1 * | 5/2004 | Harp et al. | ................... 713/200 |
| 2004/0244505 | A1 * | 12/2004 | Takenaka et al. | ....... 73/862.541 |
| 2004/0262410 | A1 * | 12/2004 | Hull | ......................... 236/91 R |

FOREIGN PATENT DOCUMENTS

| | | |
|---|---|---|
| JP | 2000-325389 A | 11/2000 |
| JP | 2001-56225 A | 2/2001 |

(Continued)

OTHER PUBLICATIONS

'Sensory-Augmented Computing: Wearing the Museum's Guide': Schiele, 2001, IEEE, 0272-1732/01, pp. 44-52.*

(Continued)

*Primary Examiner*—David R Vincent
*Assistant Examiner*—Peter Coughlan
(74) *Attorney, Agent, or Firm*—Frishauf, Holtz, Goodman & Chick, P.C.

(57) ABSTRACT

A user activity support agent in a user support apparatus includes a target detection evaluation module configured to detect demand, desire, and/or instruction of the user in the form of a target based on a user's activity state and/or an environment situation detected by a sensor group, and to ask the user whether or not the target is desired by the user via a user information providing device to evaluate the user's reaction to the information, and an activity plan evaluation module configured to plan the detected target in such a manner as to realize the target by the user's activity group, and to provide the user with information suggesting the activity group via the user information providing device to perform monitoring and/or evaluation with respect to the user's reaction to the information from the user's activity state and/or the environment situation.

18 Claims, 14 Drawing Sheets

FOREIGN PATENT DOCUMENTS

| | | |
|---|---|---|
| JP | 2001-327472 A | 11/2001 |
| JP | 2001-344352 A | 12/2001 |
| JP | 2002-278670 A | 9/2002 |
| JP | 2003-058609 A | 2/2003 |
| JP | 2003-148986 A | 5/2003 |
| JP | 2003-290155 A | 10/2003 |

OTHER PUBLICATIONS

'Land Warrior Training Initiative': Appleget, proceedings of SimTecT 2001, siaa.asn.au.*

'Integrated Navigation Capability for the Force XXI Land Warrior': Marth, 1998, IEEE, 0-7803-4330-1, pp. 193-200.*

A. Kosaka et al; Invited Paper; Fast Vision-Guided Mobile Robot Navigation Using Model-Based Reasoning and Prediction of Uncertainties; CVGIP: Image Understanding; vol. 56, No. 3, pp. 271-329; Nov. 1992.

M. Takahashi, "Personal computer software search 8", Computer and Network Lan, vol. 18, No. 5, Japan, Kabushiki Kaisha Oomu-sha, May 1, 2000, pp. 104-105.

Eisaku Hori, "Wearable 3D desktop environment system with range image", IEICE Technical Report, vol. 101, No. 652, Japan, The institute of electronics, information and communication engineers, Feb. 14, 2002, pp. 1-8.

Toshitake Takeno, Development of safety management system for workers in disassembling and assembling work, Journal of Human Interface Society, Japan, Human Interface Society, Feb. 26, 2003, vol. 5, pp. 57-64.

Japanese Office Action dated Jan. 6, 2009, and English translation thereof issued in counterpart Japanese Application No. 2004-151734.

Japanese Office Action dated Apr. 21, 2009 and English translation thereof issued in a counterpart Japanese Application No. 2004-151734.

Tsuchiya et al. "Location-sensitive Itinerary-based Passenger Information System: An Experiment of Passenger Support features of 'CyberRail'", IPSJ SIG Technical Reports, Mar. 2, 2004, pp. 85-91. vol. 2004, No. 19. Information Processing Society of Japan, Japan.

* cited by examiner

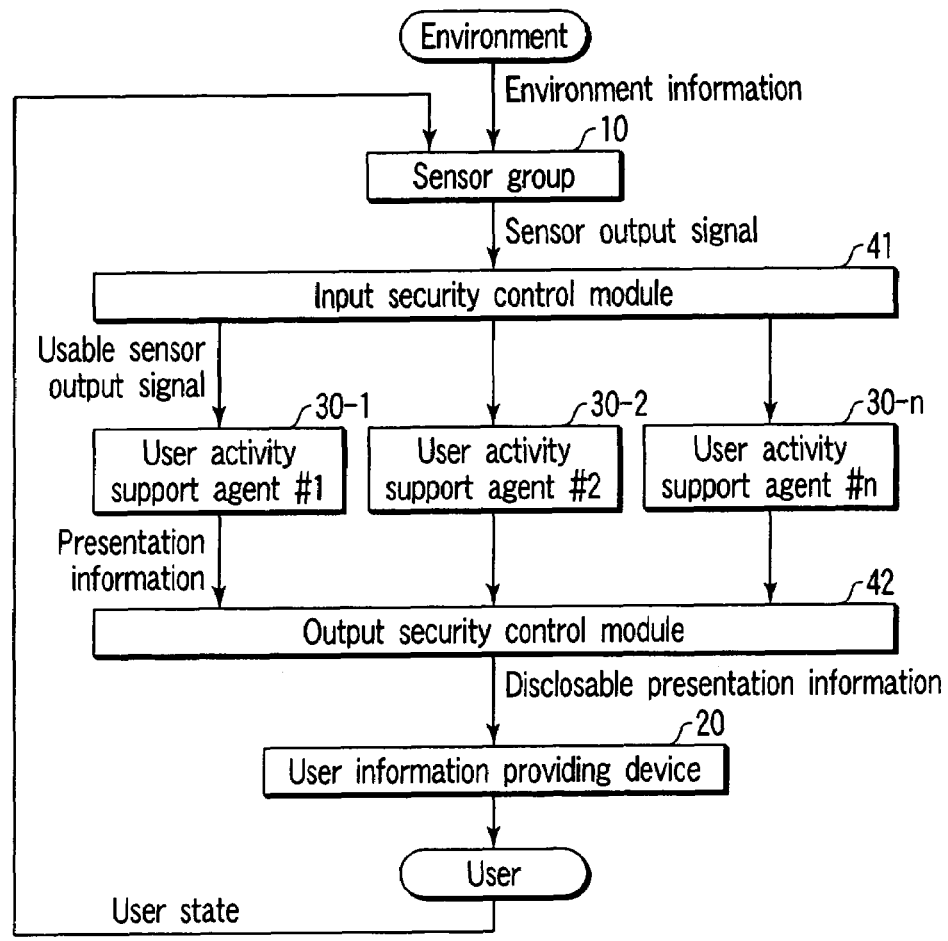
FIG. 16
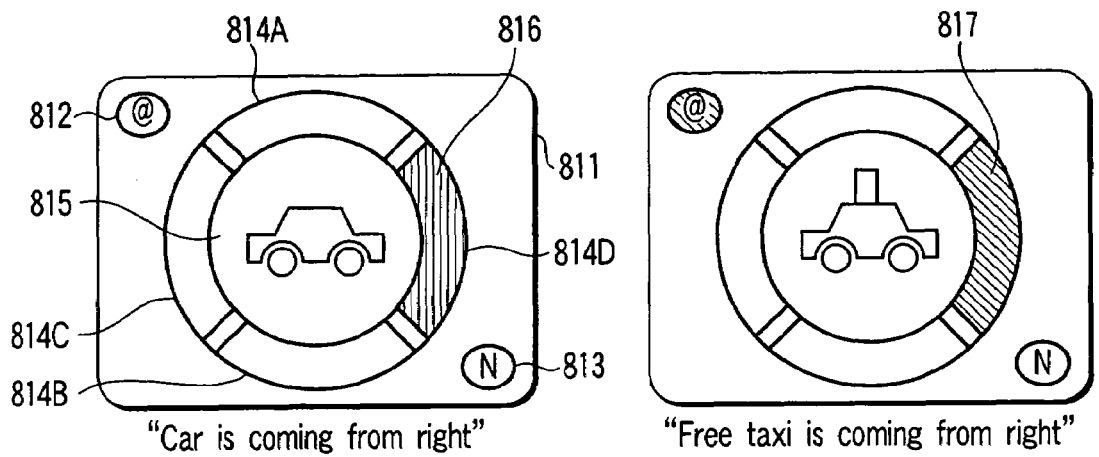
"Car is coming from right"
FIG. 18A
"Free taxi is coming from right"
FIG. 18B "Dubious human from behind"

"Dubious motorcycle from behind"

"Friend from behind"

"Maybe Yukiko"

"Stairs"

"Gyudon restaurant ahead"

"Curry restaurant to left"

"Hanako is in curry restaurant"

"It was here before"

"Maybe Iwataki"

USER SUPPORT APPARATUS

CROSS-REFERENCE TO RELATED APPLICATIONS

This application is based upon and claims the benefit of priority from prior Japanese Patent Application No. 2004-151734, filed May 21, 2004, the entire contents of which are incorporated herein by reference.

BACKGROUND OF THE INVENTION

1. Field of the Invention

The present invention relates to a user support apparatus which observes a user or an environment around the user using a sensor group to support user's activities.

2. Description of the Related Art

In recent years, sensors have been arranged everywhere in a decentralized form as a result of development of the information-oriented society and sensor techniques, and it has become possible to acquire a very large amount of support information. Moreover, a system has been established in which various items of support information are acquired from these sensors, and servers for realizing various types of services are accessed by wireless devices to support various user activities.

However, it is a problem to select the information because of overflow of information (volume increase). Moreover, a problem has occurred that it is difficult to exactly select the information based on a user's time, place, and occasion (TPO). That is, a system has become more important which selects the information in accordance with the user's tastes and which provides advice concerning intellectual stimuli and living habits. In other words, it is important to select the information in accordance with the user's activity or feeling, or the TPO based on environment situations (provide the information in consideration of the user's tastes, crowded shop state, place, and transportation means in accordance with the user's condition such as the user's hunger).

Moreover, another problem is that individuals are monitored and privacy is invaded by a decentralized sensor network. For example, a problem occurs that unspecified individuals' faces are recorded, unspecified individuals' activities are monitored, and unspecified individuals are followed by a monitor camera group arranged at street corners, and there has been a demand for a system which protects privacy.

In Jpn. Pat. Appln. KOKAI Publication No. 2001-56225, an agent apparatus has been proposed which estimates vehicle situations to communicate with a user. According to this agent apparatus, for example, an agent's processable action is proposed like "Shall I guide you to a restaurant?" in a case where the user's stomach rumble is detected at lunchtime. Moreover, as to the agent who appears in the vehicle, it is possible to select figure or voice in accordance with the user's tastes.

Furthermore, there is an example of a module which sets a goal as a target of a robot's action and which detects whether or not the goal has been achieved in a mobile robot or a human-type robot (see, e.g., A. Kosaka and A. C. Kak, "Fast vision-guided mobile robot navigation using model-based reasoning and prediction of uncertainties," CVGIP—Image Understanding, Vol. 56, No. 3, November, pp. 271 to 329, 1992).

BRIEF SUMMARY OF THE INVENTION

According to a first aspect of the present invention, there is provided a user support apparatus comprising:

a sensor group configured to detect at least one of a user's activity state and environment situation;

a user information providing device configured to provide the user with information; and a user activity support agent configured to produce information to be provided in the user information providing device based on at least one of the user's activity state and the environment situation detected by the sensor group, thereby supporting the user's activity, wherein the user activity support agent includes:

a target detection evaluation module configured to detect at least one of demand, desire, and instruction of the user in the form of a target based on at least one of the user's activity state and the environment situation detected by the sensor group, and to ask the user whether or not the target is desired by the user via the user information providing device to evaluate the user's reaction to the information; and an activity plan evaluation module configured to plan the target detected by the target detection evaluation module in such a manner as to realize the target by the user's activity group, and to provide the user with information suggesting the activity group via the user information providing device to perform at least one of monitoring and evaluation with respect to the user's reaction to the information from at least one of the user's activity state and the environment situation measured by the sensor group.

According to a second aspect of the present invention, there is provided a user support apparatus comprising:

a sensor group for detecting at least one of a user's activity state and environment situation;

user information providing means for providing the user with information; and user activity support means for producing information to be provided in the user information providing means based on at least one of the user's activity state and the environment situation detected by the sensor group to support the user's activity, wherein the user activity support means includes:

target detection evaluation means for detecting at least one of demand, desire, and instruction of the user in the form of a target based on at least one of the user's activity state and the environment situation detected by the sensor group and for asking the user whether or not the target is desired by the user via the user information providing means to evaluate the user's reaction to the information; and activity plan evaluation means for planning the target detected by the target detection evaluation means in such a manner as to realize the target by the user's activity group and for providing the user with information suggesting the activity group via the user information providing means to perform at least one of monitoring and evaluation with respect to the user's reaction to the information from at least one of the user's activity state and the environment situation measured by the sensor group.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a diagram showing a configuration of a user activity support apparatus according to a fifth embodiment of the present invention;

FIG. 18A is a diagram showing a specific information providing example in a case where a car comes from the right in the user support apparatus according to a sixth embodiment of the present invention;

FIG. 18B is a diagram showing a specific information providing example in a case where an empty taxi comes from the right in the user support apparatus according to the sixth embodiment;

DETAILED DESCRIPTION OF THE INVENTION

A best mode for carrying out the present invention will be described hereinafter with reference to the drawings.

First Embodiment

Figure 1:
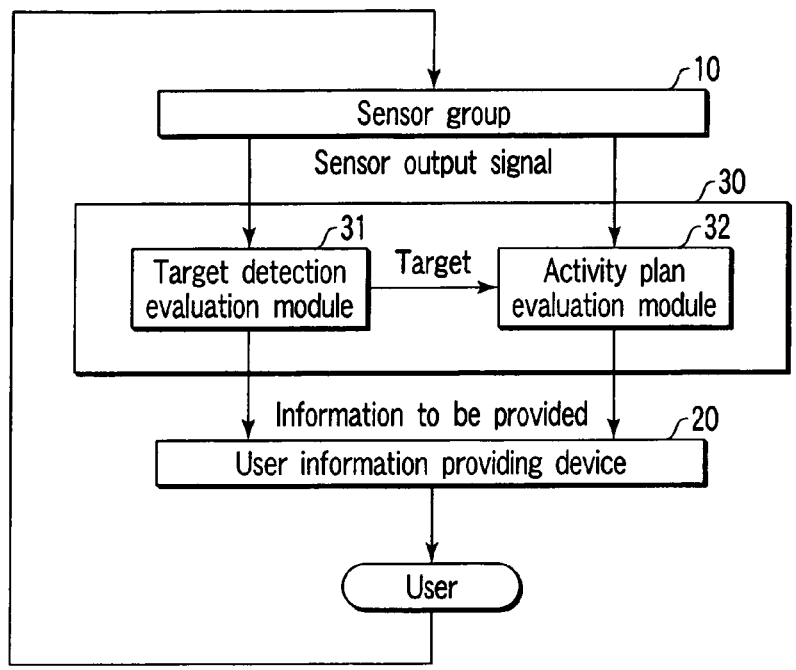
FIG. 1 is a diagram showing a configuration of a user support apparatus according to a first embodiment of the present invention.

As shown in FIG. 1, a user support apparatus according to a first embodiment of the present invention comprises: a sensor group 10 which detects the user's activity state or environmental situation; a user information providing device 20 which presents information to the user; and a user activity support agent 30 which generates information to be provided in the user information providing device 20 based on the user's activity state or environment situation detected by the sensor group 10 to support the user's activity.

Here, the sensor group 10 includes a plurality of sensors attached to the user and disposed around the user, and observes an external environment from the user's points of view.

The user activity support agent 30 supports the user's next activity or action based on an observation result of the sensor group 10 based on an action model such as plan-do-check (PDC), which is a basis of human activities. That is, the user's desire is materialized as a target, and an activity group to be performed by the user for realizing the materialized target is realized as the user's action of an activity level. The user activity support agent 30 is configured of various large module group shown in FIG. 1, that is, a target detection evaluation module 31 and an activity plan evaluation module 32. Here, the target detection evaluation module 31 detects or estimates user's desire, demand, or decision as a more specific target, and presents to the user the information indicating whether or not the target is user's desired target to evaluate the user's reaction. The activity plan evaluation module 32 makes a plan in such a manner that the target detected by the target detection evaluation module 31 can be realized by user's activity group, and the module presents information suggesting the activity group to the user, and monitors and evaluates user's reaction from the user's activity state or environment situation.

Figure 2:
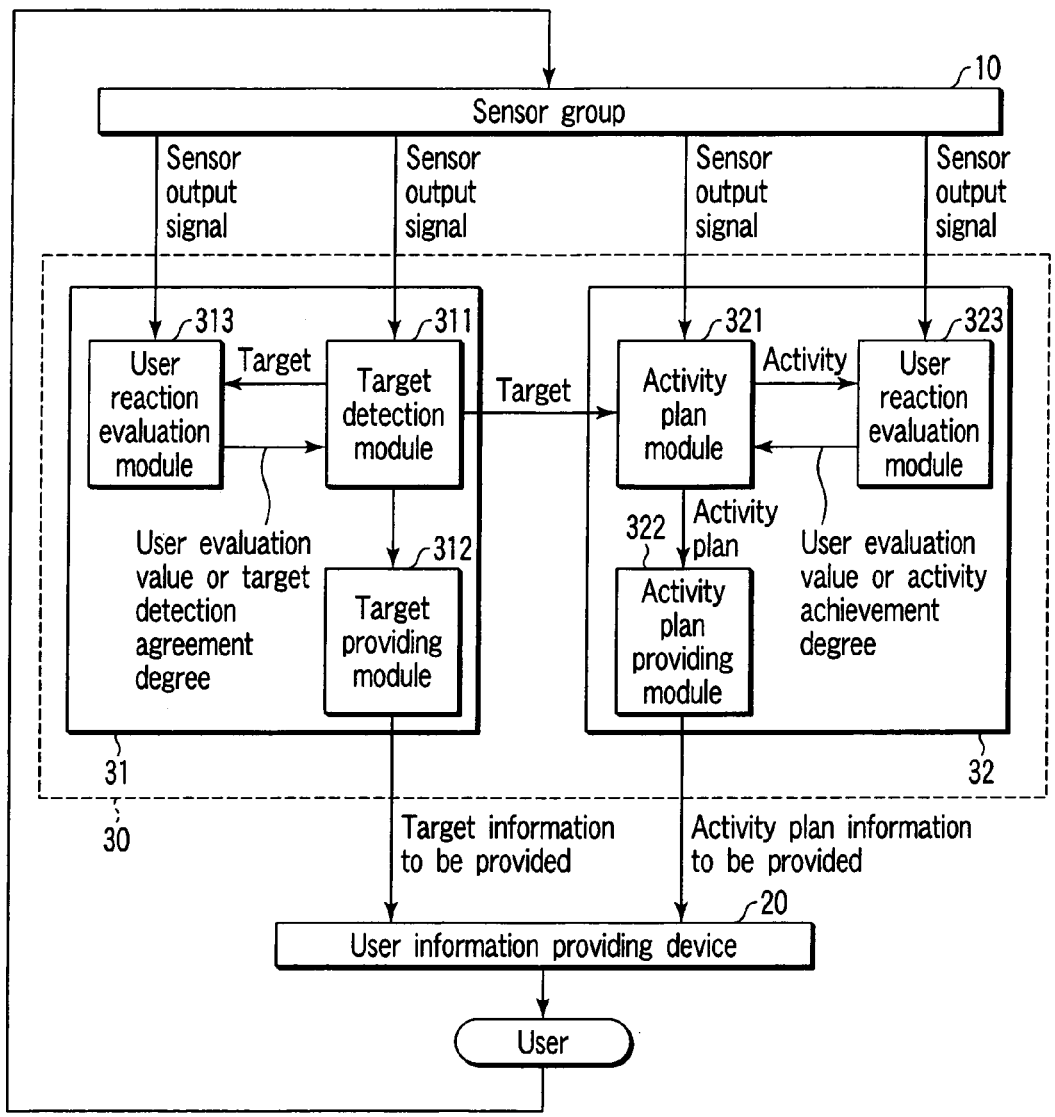
FIG. 2 is a diagram showing a detailed configuration of the user support apparatus according to the first embodiment.

More specifically, the large module groups are configured of small module groups as shown in FIG. 2.

That is, the target detection evaluation module 31 has a target detection module 311, a target providing module 312, and a user reaction evaluation module 313. Here, the target detection module 311 detects user's demand, desire, or instruction in the form of the target based on the user's activity state or environment situation detected by the sensor group 10. The target providing module 312 allows the user information providing device 20 to provide the target detected by the target detection module 311. The user reaction evaluation module 313 monitors the user's reaction to the information presented to the user by the target providing module 312 via the user information providing device 20 from the user's activity state or environment situation detected by the sensor group 10 to evaluate the degree of detecting the target. An evaluation result of the user reaction evaluation module 313 is fed back to the target detection module 311.

That is, the target detection module 311 of the target detection evaluation module 31 detects or estimates the user's desire, demand, or decision concerning the activity using a signal of the sensor group 10 attached to the user or disposed around the user. For example, when a command set by the user information providing device 20 is input via a sound command from the user, or directly by the user, the user's desired target is detected in some case. Alternatively, user's desire or demand is detected from the sensor group 10 attached to the user to detect the target. When the command is not directly transmitted from the user, the target providing module 312 produces presentation contents provided in such a manner as to confirm whether or not the detected or estimated target is really the user's desired target, and the user information providing device 20 provides the presentation contents. Moreover, the user reaction evaluation module 313 evaluates the user's reaction via the sensor group 10, and the target detection module 311 receives the evaluation result. When the evaluation is correct (i.e., in a case where it is estimated that the target is desired by the user), the target is transmitted to the activity plan evaluation module 32. If not, the user's target is detected again.

Moreover, the activity plan evaluation module 32 has an activity plan module 321, an activity plan providing module 322, and a user reaction evaluation module 323. Here, the activity plan module 321 plans the user's activity for achieving the target based on the user's activity state or environment situation detected by the sensor group 10, and the target detected by the target detection module 311. The activity plan providing module 322 allows the user information providing device 20 to provide the information suggesting the activity in accordance with an activity plan prepared by the activity plan module 321. The user reaction evaluation module 323 monitors the user's reaction induced by the information of the activity plan providing module 322 from the activity state or the environment situation to evaluate the reaction. The evaluation of the user reaction evaluation module 323 is fed back to the activity plan module 321.

That is, the activity plan module 321 in the activity plan evaluation module 32 plans an action or an action group to be taken by the user in order to achieve the target detected or estimated by the target detection evaluation module 31 or set by the user. The activity planned in this manner is presented to the user in the form of suggestion via the user information providing device 20 as occasion demands.

On the other hand, the user reaction evaluation module 323 in the activity plan evaluation module 32 evaluates achievement degree concerning the target or the planned activity, a situation in which the user's activity is placed, the user's state and the like, while inputting the signal from the sensor group 10 attached to the user or the sensor group 10 disposed in the environment. If necessary, the achievement degree with respect to the target is sent to the user information providing device 20 via the activity plan providing module 322, and presented to the user at any time.

In this case, when there is a trouble in executing the activity plan prepared beforehand estimating from the situation where the user's activity is placed, the user reaction evaluation module 323 notifies the effect to the activity plan module 321. To respond, the activity plan module 321 sets again (replans) the activity the activity plan in accordance with the existing situation. When the activity plan cannot be carried out, the effect is presented to the user via the activity plan providing module 322, and the user reaction evaluation module 323 obtains confirmation from the user.

Figure 3:
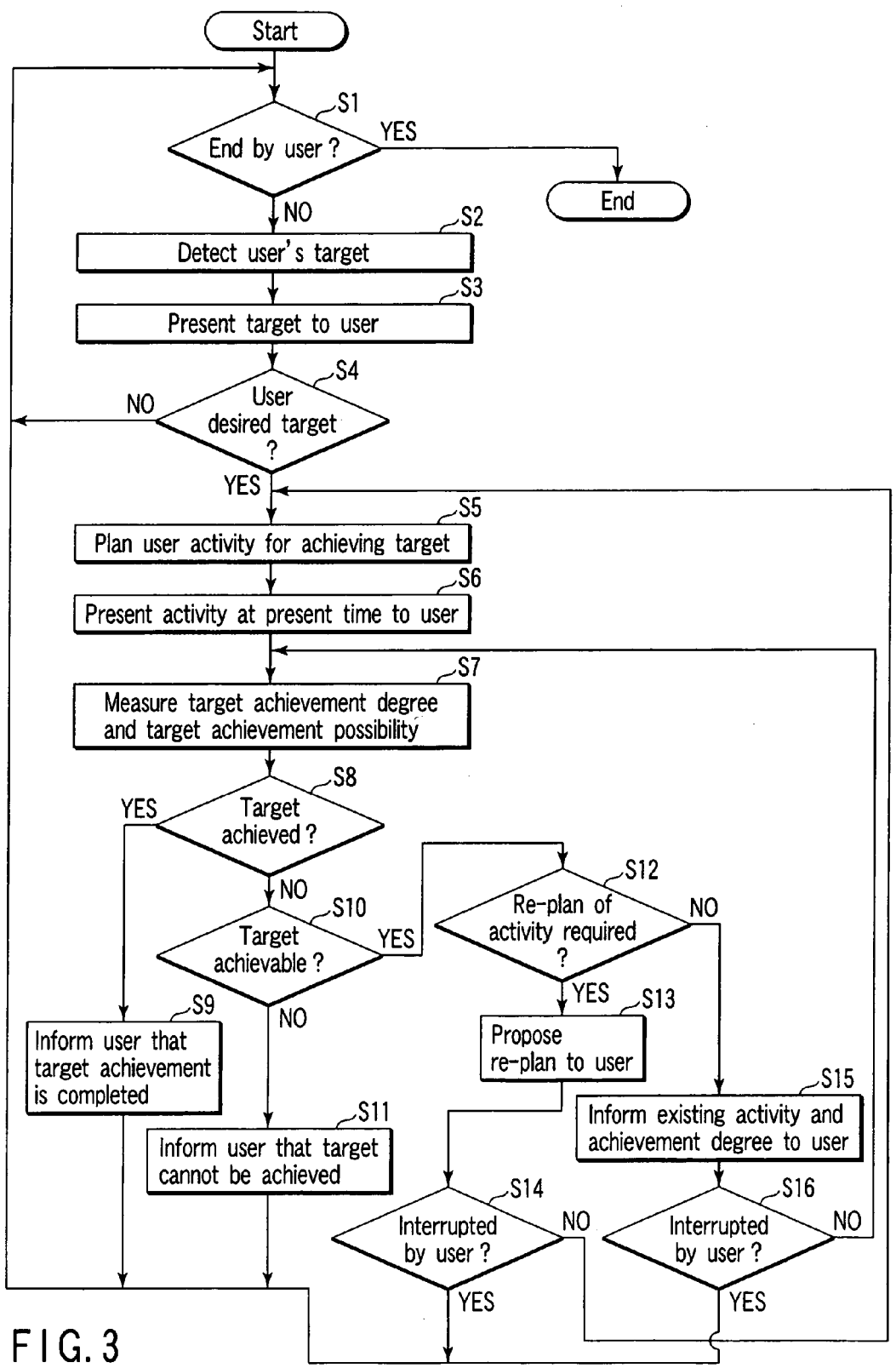
FIG. 3 is an operation flowchart of a user activity support agent in the user support apparatus according to the first embodiment.

An operation of the user activity support agent 30 will be described hereinafter in the user support apparatus according to the present embodiment with reference to a flowchart of FIG. 3.

That is, when the operation of the user activity support agent 30 is started, first in the target detection evaluation module 31, the user confirms whether or not the user activity support agent 30 ends (step S1). If the user does not intend to utilize the agent, the execution of the present user activity support agent 30 is ended.

If not, the target detection evaluation module 31 detects a target based on the user's desire/demand (step S2). Moreover, it is confirmed/displayed whether or not the target detected in this manner is correct via the user information providing device 20 (step S3). The user confirms this in step S4. If the target is not correct, the process advances to step S1. If it is correct, the process shifts to the next step S5.

That is, when the target is correct, the activity plan module 321 in the activity plan evaluation module 32 prepares the plan of the activity for achieving the target (step S5). Moreover, the prepared activity plan is supplied to the user via the user information providing device 20 (step S6). The user starts the activity based on the activity plan.

In and after step S7, the user's activity is monitored by the user reaction evaluation module 323 in the activity plan evaluation module 32 at any time. That is, first the user reaction evaluation module 323 estimates degree of achievement with respect to the target, and estimates from existing situations whether or not the target is achieved (step S7). Moreover, when the target is already achieved (step S8), the result is supplied to the user via the user information providing device 20 (step S9), and thereafter the process returns to step S1.

On the other hand, when the target cannot be achieved yet (step S8), the existing activity is continued, and it is estimated whether or not the target can be achieved (step S10). When the target cannot be achieved, the effect is supplied to the user via the user information providing device 20 (step S11), and the process returns to step S1.

Alternatively, when the target can be achieved while continuing the existing activity, it is estimated whether or not the activity needs to be re-planned (step S12). When the re-planning is required, the user reaction evaluation module 323 first informs the user of the effect via the user information providing device 20 in order to request the activity plan module 321 to re-plan the activity (step S13). Moreover, it is estimated by the user reaction evaluation module 323 whether or not there is an interrupt from the user in accordance with the presentation contents (step S14). If there is not any interrupt, it is estimated that the user admits the request for the re-plan, and the process returns to step S5. On the other hand, when there is the interrupt, the process returns to step S1.

Moreover, when it is estimated in step S12 that the re-plan is not required, the contents of the existing activity and the degree of achievement with respect to the target are supplied to the user via the user information providing device 20 (step S15). Moreover, it is estimated in the user reaction evaluation module 323 whether or not there is the interrupt from the user in accordance with the presentation contents (step S16). Here, if there is not any interrupt, the process returns to step S7. When there is the interrupt, the process returns to step S1.

A specific example will be described hereinafter.

An example of an agent which supports the user's activity will be mainly described in a case where the user's visual function has declined because of visual trouble (glaucoma, etc.).

It is assumed that the target is navigation from the user's home A to a coffee shop B which is a destination. At this time, the user's desire is indicated via user's voice to issue the target. In this case, the target detection evaluation module 31 inputs a sound signal, and the voice is recognized as a command to thereby detect the target. In another method of setting the target, in a case where the command is more directly input, for example, navigation+target destination (coffee shop B) is selected from a command menu or the like in the user information providing device 20.

With regard to the target indicated by the user, the activity plan module 321 plans as a schedule an action group for the user to reach the coffee shop B which is a destination from the home A which is the user's present location. For example, this action group includes the following:

walk to an elevator hall in the fourth floor of the existing apartment house;
press an elevator down button in the elevator hall;
wait for the elevator to come;
get in the elevator, and press a ground-floor button in the elevator;
move from the fourth floor to the ground floor by the elevator;
get off the elevator;
find a road L1 directly leading from the vicinity of the elevator;
move straight to the east by 100 m along the road L1 (about 160 steps on foot by the user);
turn right in an intersection C1;
move straight to the north by 300 m along a road L2 (about 500 steps on foot by the user);
find the coffee shop B on the left; and
enter the coffee shop B. The action plan comprising the above action group is planned as the schedule.

The actions planned in this manner are provided to the user via the user information providing device 20. For example, a way to the coffee shop B which is the destination, and the user's present location are provided with respect to the user. For examples it is proposed that the user should turn right in the intersection C1. On the road L2, a rough distance to the destination (coffee shop B) is indicated.

On the other hand, the user reaction evaluation module 323 monitors the user's target achievement degree using the sensor group 10 attached to the user or the sensor group 10 disposed in the environment based on a signal obtained from the sensor group 10, and the module also monitors a situation where the user is. Examples of the sensor group 10 attached to the user include a binocular stereo camera, stereo microphone, GPS sensor, pedometer, position estimating beacon and the like. That is, the sensor group 10 is selected which is required for monitoring the target achievement degree with respect to the activity planned by the activity plan module 321, and degree of progress of the activity is monitored by a signal from the sensor group 10. For example, to measure the degree of progress of the travel to the destination, information is utilized such as a global position by a GPS sensor, and an estimate distance by the accumulated number of steps calculated by the pedometer.

Another important function of the user reaction evaluation module 323 is monitoring of an environment where the user is, and the user's situation. That is, the sensor group 10 is further disposed with respect to the user in such a manner as to monitor the user's environment or situation. Examples of the sensor include a wide-angle stereo camera for observing the user's view field, stereo microphone, gyro for estimating the user's position/posture, accelerometer, pedometer. A sensor or the like is usable which inputs detailed information of environmental situation change or local environment while communicating with a beacon or the like disposed in the environment. That is, the wide-angle stereo camera and the stereo microphone are modules which detect obstacles and the like in front of the user. More specifically, a three-dimensional map of a space in the user's walking range is reconstructed in real time by the stereo camera. Moreover, when there is an obstacle hindering the walking in the three-dimensional map in the user's predicted walking range, this effect is informed with respect to the user via the user information providing device 20. By this information, the user reaction evaluation module 323 also informs this effect with respect to the activity plan module 321 in the form of activity degree and re-plan request in a case where there is a trouble in carrying out the user's future planned activity, and the activity plan module 321 re-plans the activity plan with respect to the target set by the target detection evaluation module 31. When the activity cannot be re-planned in such a manner as to achieve the target, this effect is informed with respect to the user. For example, when a front part of a route is under construction, and the user cannot pass through the part, another route is re-planned.

Moreover, when the number of steps is measured, information may be provided such as corresponding a person's steps, predicted remaining steps in accordance with a walking speed, and progress degree for the target based on a relation between the user's steps and moving distance.

When this cycle is repeated, the activity is supported in order to realize the target.

Here, an example of the sensor group 10 will be described which is attached to the user in order to achieve the object.

Figure 4A:
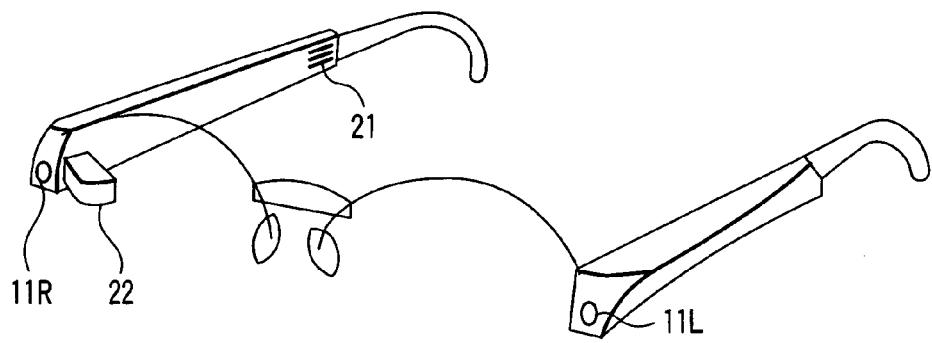
FIG. 4A is a perspective view showing an eyeglass-type sensor group as one example of a sensor group.
Figure 4B:
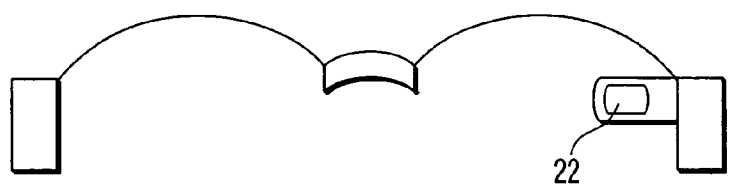
FIG. 4B is a back view of the eyeglass-type sensor group.

FIGS. 4A and 4B show an eyeglass-type sensor group 10. In the sensor group 10, camera modules (imaging modules) 11R, 11L are incorporated in left and right ends of an eyeglass-type frame, and the two camera modules 11R, 11L configure a stereo camera. A stereo microphone (not shown) or the like is attached to a stem portion of the eyeglass-type frame. By the stereo microphone, a sound can be input which covers a dynamic range audible to the user's ears, or a higher dynamic range.

Moreover, a stereo speaker 21 configuring a part of the user information providing device 20 is attached to the vicinity of the user's ear in the stem portion of the eyeglass-type frame. The information can be provided in the form of sound to the user by the stereo speaker 21. Furthermore, a small display 22 similarly configuring a part of the user information providing device 20 is attached to a front portion of the eyeglass-type frame within the user's view field. When the information is visually provided via the small display 22, various information can be supplied to the user. The small display 22 also has a function of outputting an image picked up by the right or left camera module 11R, 11L, visual information such as character and icon information is superimposed upon the image captured in this manner, and information may be superimposed in the form of addition to an object detected in a camera view field.

Furthermore, although not especially shown, a gyro sensor or an accelerometer may be added to this eyeglass frame in such a manner as to correct vibration of the image captured by the right/left camera accompanying user's movement.

Moreover, when the gyro sensor, accelerometer, or GPS sensor is similarly added, it is also possible to detect position and posture information of the user in the environment. For example, the user's absolute position on the globe can be measured by the GPS sensor. By combination of the signal and information of the gyro sensor and accelerometer, the posture information can be input with respect to the user's environment.

Moreover, although not shown, the pedometer may be attached to the user. When the signals of the pedometer and the GPS sensor, gyro sensor, or accelerometer are fused, a three-dimensional position/posture can be more precisely measured in user's environment.

Needless to say, to process the signal of the sensor group 10, it is evident that various types of signal processing can be executed, and further software can be executed to realize the agent function described above by a computing device (not shown) such as a computer (e.g., wearable computer) attached to the user. When the signal from the sensor group 10 is an analog signal, the signal is converted into a digital signal via an analog-to-digital converter or the like in the computer, and the sensor signal described above can be processed.

On the other hand, by the stereo camera attached to the eyeglass-type frame, a space in front of the user can be three-dimensionally re-configured from the image captured by both the camera modules 11R, 11L. By this three-dimensional reconstitution, an object existing in the user's view field can be detected, or a distance to the object cam be measured. Further processing may be executed utilizing the image captured by the camera modules 11R, 11L. For example, when character information is extracted from the camera image, such as a sign, characters in the sign, and a signboard, timely information can be obtained, or superimposed together with the image upon the small display 22 based on the character information, and map information stored beforehand in the wearable computer. This may be performed based on map or position information obtained by communication with a sensor or a beacon comprising the wearable computer buried in the environment, or by communication with another database directly, or via a cellular phone or via radio, instead of the map information stored in the wearable computer.

Figure 5:
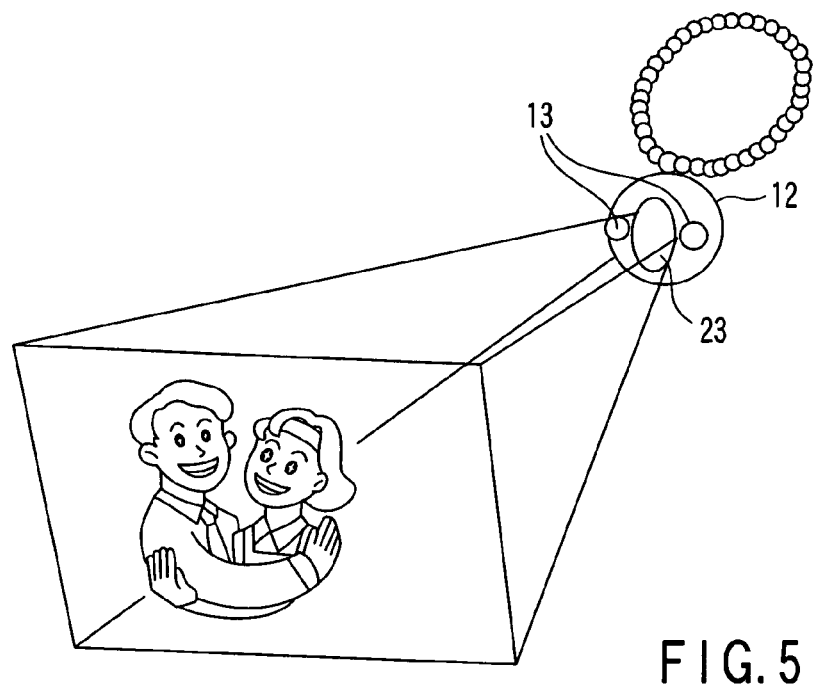
FIG. 5 is a perspective view showing a pendant-type sensor group device as another example of the sensor group.

There is a pendant-type sensor group device 12 shown in FIG. 5 as another example of the sensor group 10. The pendant-type sensor group device 12 contains a super-wide-angle stereo camera 13. The device also contains a gyro sensor, accelerometer, pedometer, GPS sensor, stereo microphone and the like (not shown). Furthermore, a micro projector 23 is disposed as the user information providing device 20. Moreover, although not shown, output signals of the above-described sensors are transmitted to a wearable computer or the like, and various types of processing and the above-described agent function are executed in the wearable computer. A user may attach the micro display as a wearable display to the vicinity of the user's right or left eye as shown in FIGS. 4A and 4B. When the wearable display is attached, various types of information may be provided in the display. The micro projector 23 attached to this pendant may project/provide the information with respect to the user's palm.

The information on the user's posture can be measured by the gyro sensor or the accelerometer of the pendant-type sensor group device 12. The user's rough position can be measured with respect to the environment by the pedometer and the GPS sensor.

Figure 6:
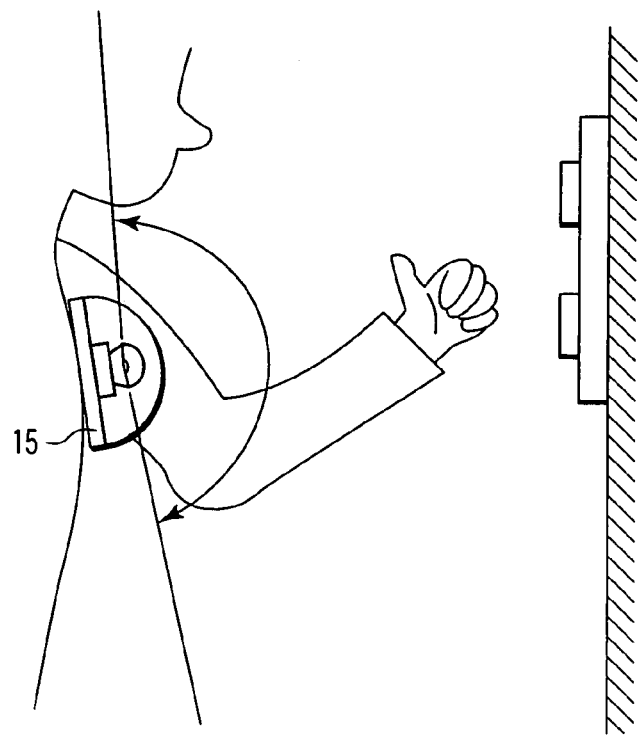
FIG. 6 is a diagram showing a use situation of the pendant-type sensor group device of FIG. 5.
Figure 7:
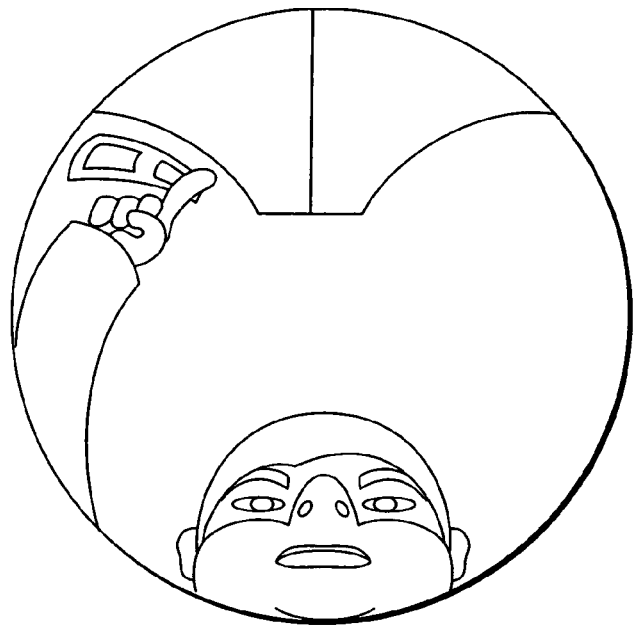
FIG. 7 is a diagram showing an image captured by a super-wide-angle stereo camera disposed in the pendant-type sensor group device in the use situation of FIG. 5.

Moreover, as described above, a super-wide-angle single-lens camera or the super-wide-angle stereo camera 13 is attached to the pendant-type sensor group device 12. For example, when the device is attached as the pendant to the user's chest part as shown in FIG. 6, the right or left camera of the super-wide-angle stereo camera 13 can photograph a part of the user's face, the user's arm or fingers, and the user's front and lower environments as shown in FIG. 7. Therefore, when the stereo image captured by the right/left cameras is analyzed, it is possible to recognize the user's face direction, a part of user's facial expression (when captured), the user's gesture by hands/fingers and arms, the user's walking environment, the user's front obstacle or the like.

Figure 8:
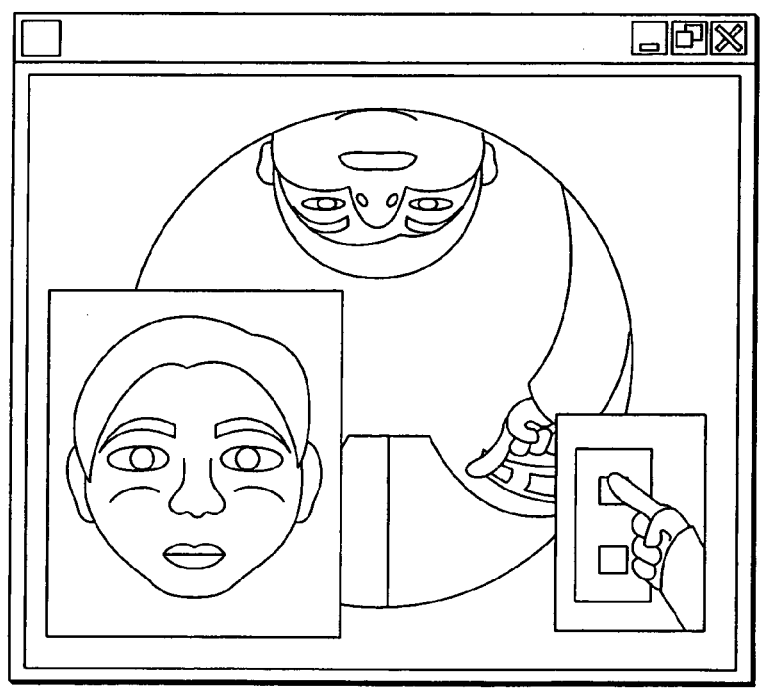
FIG. 8 is a diagram showing a display example in which an image of FIG. 7 is processed and provided.

For example, when the user is to press an elevator button as shown in FIG. 6, an image is captured with the right or left camera as shown in FIG. 7. When the images captured by the super-wide-angle stereo camera 13 are processed, the user's operation state can be monitored until the button is pressed. In this case, the state is displayed with respect to the operation to press the button, for example, as shown in FIG. 8. In this case, distortion is removed from the image captured at a super wide angle, so that the user's state can be easily understood as an image. The image in the vicinity of the user's hands/fingers may be enlarged and displayed in the wearable display in such a manner that an operation by the hands/fingers is easily seen especially for a user who has a visual trouble or who is near-sighted. Thus, the user's activity can be remarkably supported. As shown on the left side in FIG. 8, a whole facial expression view or the like can be estimated using the user's head expression model or the like from image information of a part of the user's head shown in FIG. 7.

Figure 9:
FIG. 9 is a diagram showing a user's arms and hands captured by the super-wide-angle stereo camera in the pendant-type sensor group device of FIG. 5.

Moreover, FIG. 9 shows the user's arms/hands/fingers/thumbs captured by the super-wide-angle stereo camera 13 in the pendant-type sensor group device 12 shown in FIG. 5. As seen from FIG. 9, the user's gesture can be easily captured by the super-wide-angle stereo camera 13 in the pendant-type sensor group device 12. Therefore, when the images are analyzed, and when various types of gestures preset by the user are registered as commands beforehand, the device may function as an input interface with respect to the user activity support apparatus.

Figure 10:
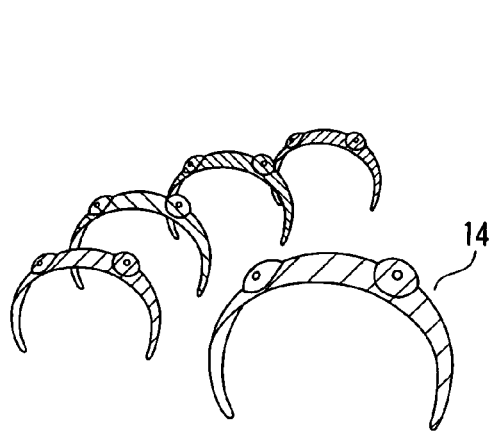
FIG. 10 is a diagram showing a headband-type sensor group device as still another example of the sensor group.
Figure 11:
FIG. 11 is a diagram showing that the headband-type sensor group device is attached to user's head.

There is a headband-type sensor group device 14 comprising a sensor group attached to a headband-type frame as shown in FIG. 10, which is another example of the sensor group 10. FIG. 11 is a diagram showing that the headband-type sensor group device 14 is attached to the user's head. Thus, the function similar to that of the eyeglass-type device shown in FIGS. 4A and 4B can be added even to the sensor group 10 attachable to the user's head.

As described above, according to the user support apparatus of the first embodiment of the present invention, the user's state or the situation of the environment around the user is detected using the sensor group to more exactly and finely estimate the user's state. Accordingly, the user's activity can be supported while handling the user's desire or a change of the user's desire with time. Moreover, adequacy of the target is evaluated, and the target can be set again in accordance with the evaluation result. Furthermore, the adequacy of the activity support plan produced from the target is evaluated, and the activity support plan can be produced again in accordance with the evaluation result. Since the user's state or the situation around the user can be observed corresponding to the user's observation view point, the user's interest, or situations concerning the user and environment can be observed more correctly. Furthermore, since it is possible to simultaneously observe the environment around the user, the user's head position/posture or facial expression and the like, the user can be more exactly observed. It is also possible to exactly capture the user's motion, and the activities can be more exactly recorded or predicted. Furthermore, a part of the user's face, the user's arms or hands/fingers, and environment below the user are captured which are not brought into the user's view, and the images are analyzed. Consequently, it is possible to recognize the user's face direction, a part of the user's facial expression (when captured), the user's gesture by hands/fingers and arms, the user's walking environment, the user's front obstacle and the like.

Second Embodiment

In the first embodiment, an agent has been mainly described which observes the user's state or environmental situation based on a sensor signal using information from a sensor group 10 attached to a user and which supports the user's activity. However, all sensors of the sensor group 10 do not have to be necessarily attached to the user, and the user's state or environmental situation may be monitored using a signal from a sensor disposed beforehand in a fixed manner in the environment.

Figure 12:
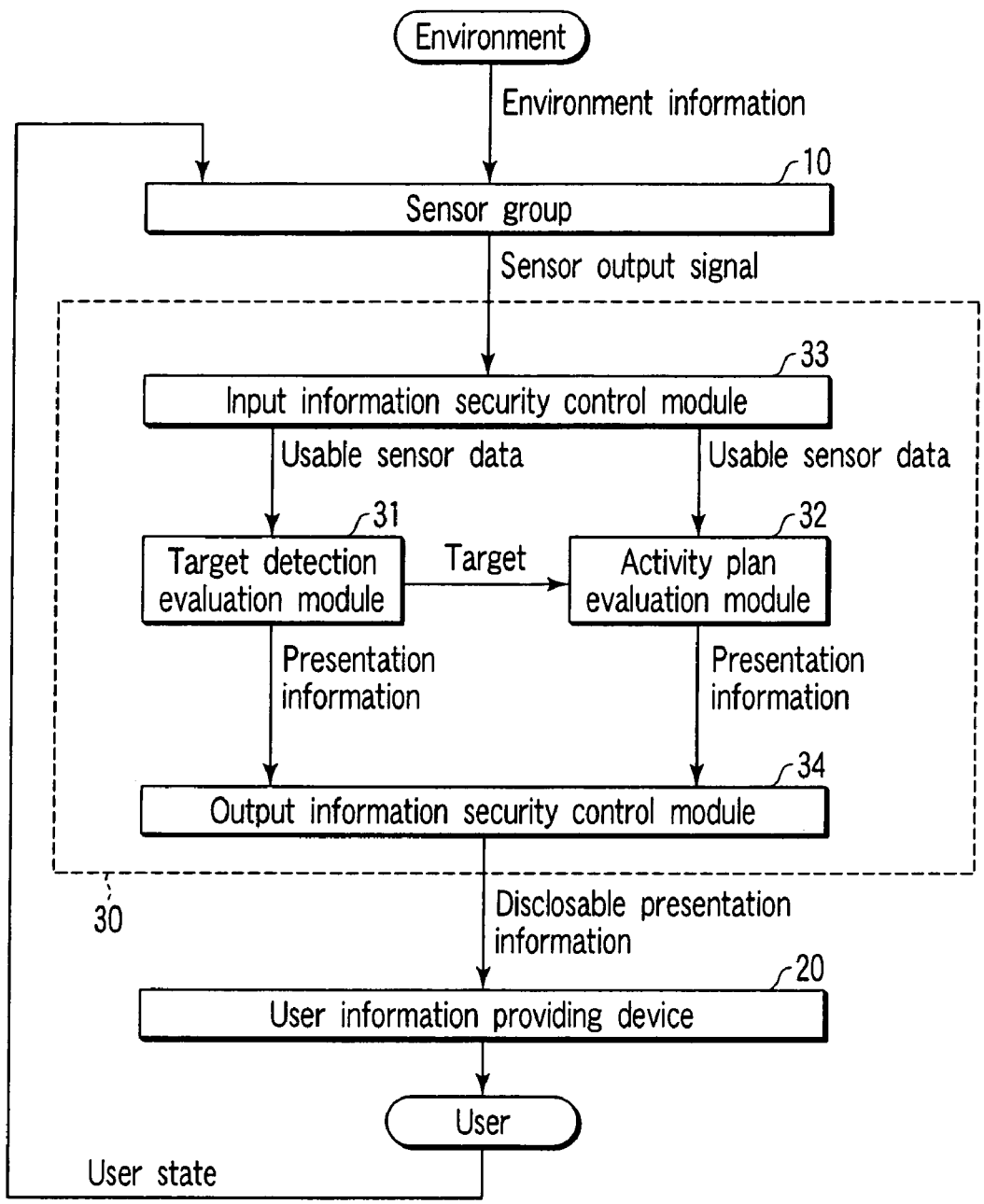
FIG. 12 is a diagram showing a configuration of a user activity support apparatus according to a second embodiment of the present invention.
Figure 13:
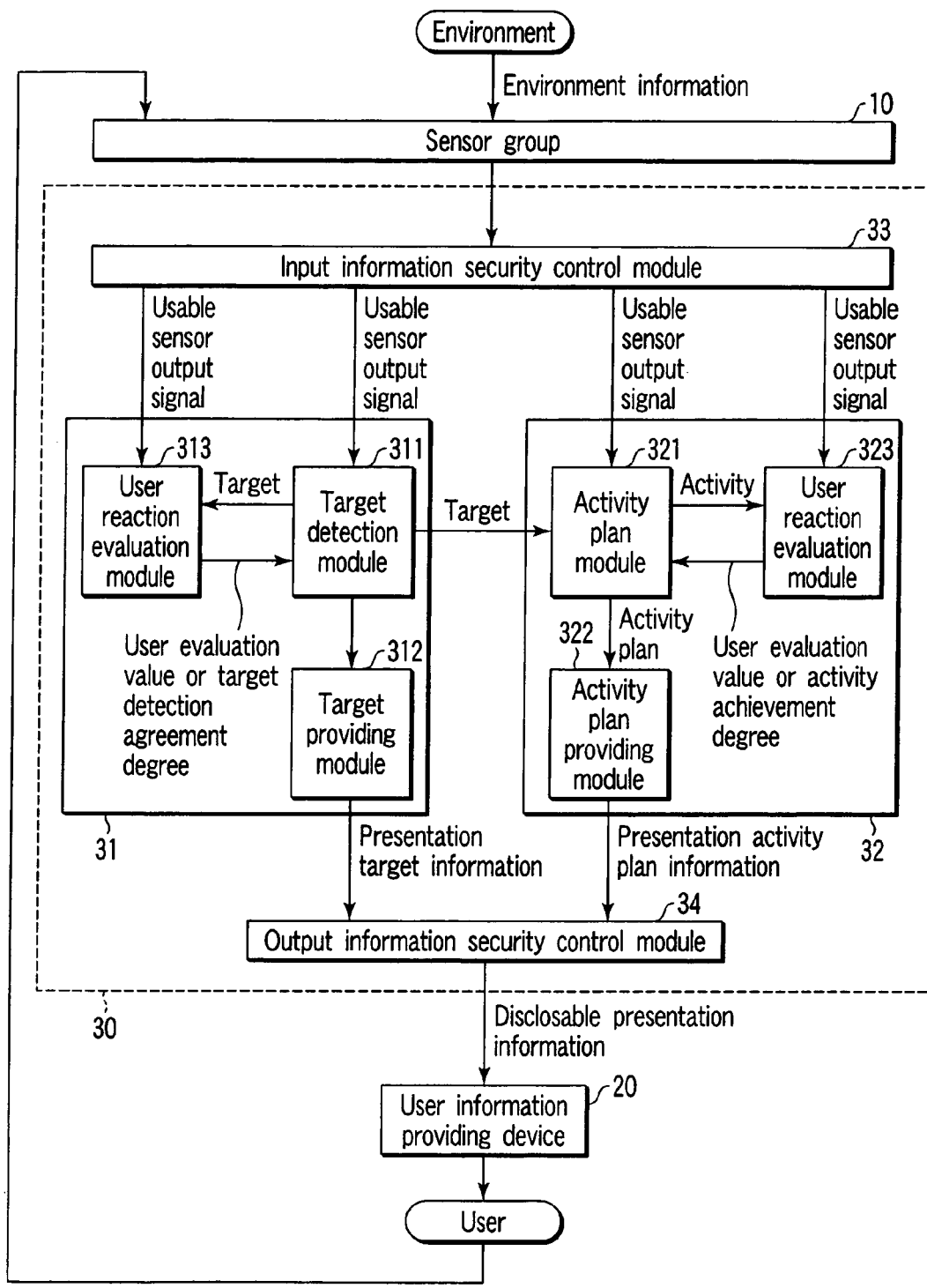
FIG. 13 is a diagram showing a detailed configuration of the user support apparatus according to the second embodiment.

As shown in FIGS. 12 and 13, a user activity support apparatus according to a second embodiment of the present invention comprises an input information security control module 33 and an output information security control module 34 in addition to the configuration of the first embodiment. In the present embodiment, these information security control modules 33, 34 add security labels (information disclosure degree) to sensor signals themselves with respect to signals obtained from the sensor group 10, and it is accordingly possible to control whether or not the signal can be thereafter published. That is, in the present embodiment, only information usable as user's security level is inquired from the sensor group 10 disposed in an external environment by communication with the external sensor. Consequently, the only information usable for the user is effectively used, and the user's activity situation can be monitored.

For example, when a security camera disposed in the environment is used, an image that cannot be seen directly by the user can be acquired by communication. When the image is directly processed, various events or obstacles can be found in the user's travel direction in an early stage.

Moreover, other information includes road congested situation and the like. That is, when the congested situation of the road to be selected by the user is input from an external sensor by a service usable by the user, the security level of the information from the sensor is controlled in accordance with the type of the user or service, and it is accordingly possible to obtain the information.

In a case where the image or video is captured by the external sensor, and obtained in this manner, it can be determined whether or not the image can be directly obtained by the security level of the user who obtains the information, when the input information security control module 33 communicates with the external sensor. For example, in a security camera disposed in user's house, information security level belonging to the individual has such a disclosure degree that is given only to the individual in question, and the disclosure degree (disclosure label) is given to another user who is not permitted to access the information. When there is a privacy problem, for example, as in the other individual's captured face information, the captured face image or the like can be provided with such a security label that the information cannot be disclosed by another user unless permitted by the original user.

Figure 14:
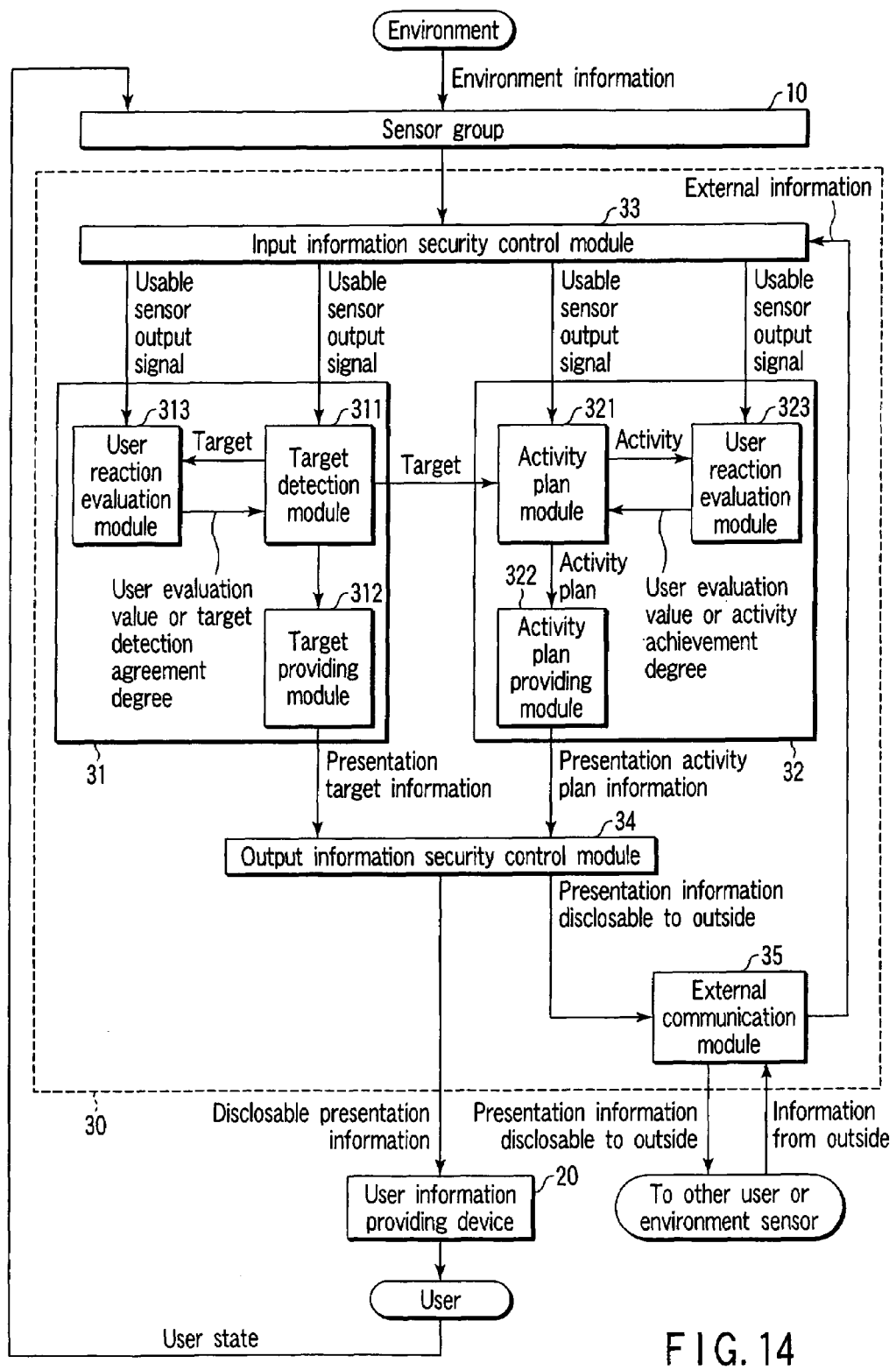
FIG. 14 is a diagram showing a configuration of modification of the user activity support apparatus according to the second embodiment.

Moreover, when the security label (information disclosure degree) is added even to the output of the sensor attached to the user, it is possible to control the providing of the information from the sensor with respect to the other user or environment. When the information observed by the user in this manner is supplied to a specific user or environment service, the information can be shared with the specific user, and the other user's activity can be supported by the shared information. FIG. 14 shows this example. The example is realized by an external communication module 35 connected to the information security control modules 33, 34 which control the disclosure degree of the information. In this case, needless to say, the external communication module 35 may use a sensor buried in the other user or environment, wireless communication such as Blue Tooth (registered trademark) and the like.

When the information disclosure degree is added to the signal from the sensor group 10 or the information provided to the user, it is possible to control security with respect to information input into the user activity support agent 30 and security of the information to be provided to the user.

In another example, a user activity support apparatus for a senior is attached to a user, and the user walks in the environment. In the example, it is reported to an external sensor that the user has a visual problem, and the activity can be supported in such a manner as to arouse attentions to other pedestrians, automobiles and the like.

Furthermore, the user's image sensing contents from the outside are transmitted only to the user's user activity support apparatus by the security label, the contents are processed into predicted action information, for example, indicating that the user is crossing the road, and private information is input. Moreover, after adding the security label to the information again by the output information security control module 34, the information may be transmitted by the external communication module 35.

As described above, according to the user support apparatus of the second embodiment of the present invention, the security can be controlled with respect to the information disclosure. More objective (updated) exact information on the environment can be obtained by an environment buried sensor capable of observing existing environment information in a broad range.

Third Embodiment

Figure 15:
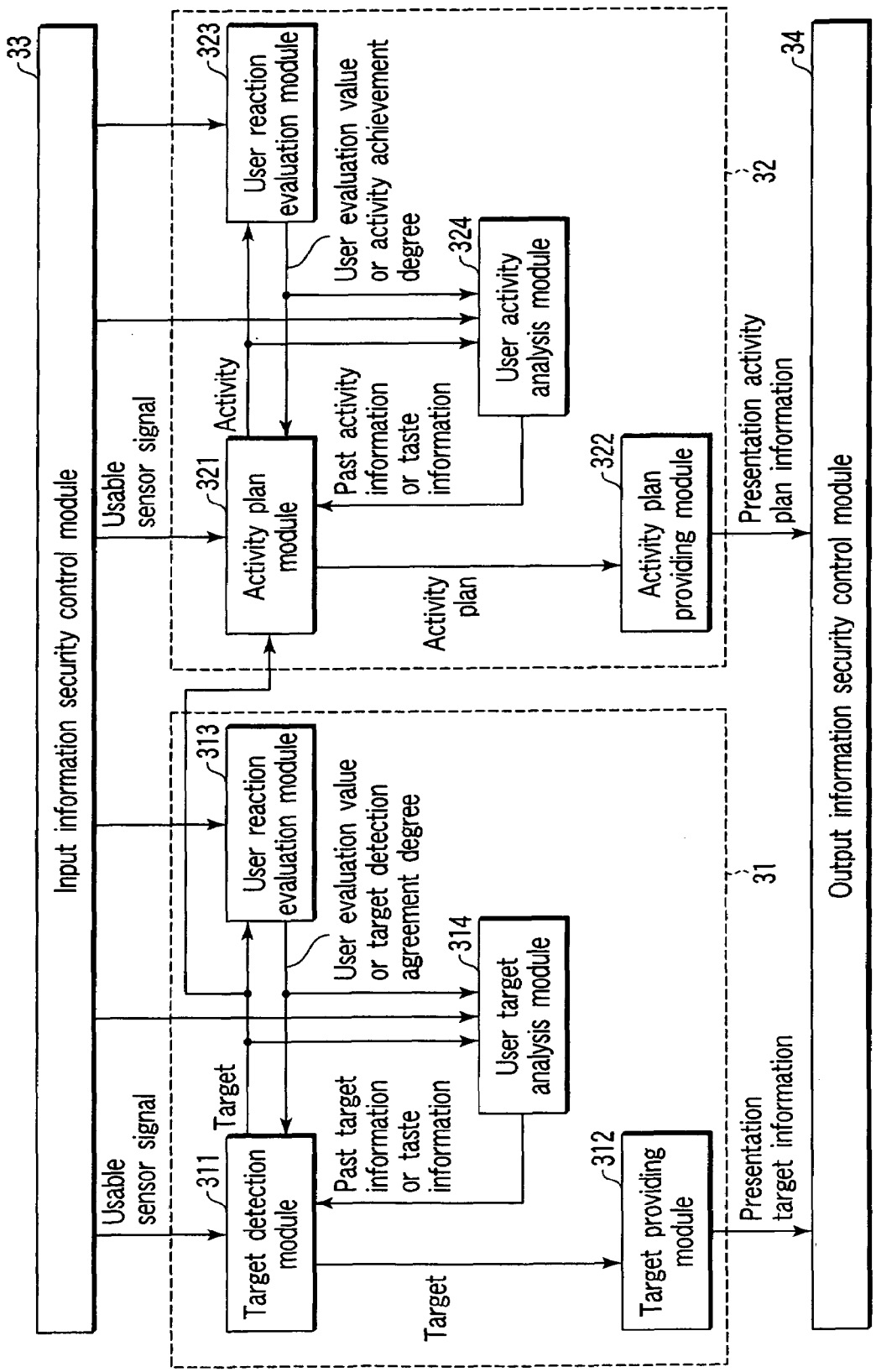
FIG. 15 is a diagram showing a configuration of an activity plan module in the user activity support apparatus according to a third embodiment.

As shown in FIG. 15, in a user activity support apparatus of a third embodiment of the present invention, a user activity analysis module 324 is disposed in the activity plan evaluation module 32. In the user activity analysis module 324, history (activity history) is recorded with respect to the user's activity in view of the activity planned by an activity plan module 321, evaluation result of the user's reaction to the activity, and a sensor output (e.g., TPO) in this case. Additionally, the user's tastes obtained from the activity history is recorded (i.e., the user's activity tendency indicating the activity and reaction easily taken in accordance with TPO). It is to be noted that, although not especially shown, the user activity analysis module 324 comprises an activity history recording sub-module, and a taste analysis recording sub-module. When the user's tastes can be analyzed and further recorded in this manner, service or activity support can be provided based on the user's past experience or activity history from the user's viewpoint. That is, the user's reaction in the past activity is stored as an "activity history" comprising a set of the activity, the user's reaction, and TPO in the activity history recording sub-module.

For example, taste is analyzed in the following method. That is, by the activity history, it is possible to define a probability of TPO where the activity itself could occur which is an entity of the activity history. Association between a certain activity history A and another activity history B is shown in a graph. That is, the activity histories A and B are used as nodes of the graph, and the probability of occurrence of the activity history A or B is defined as node information. On the other hand, when a cause/effect relation or cooccurrence relation between the activity histories A and B is shown as an edge of the graph, a relation graph between the activity histories can be obtained. When the graph of the activity history is produced, in the taste analysis recording sub-module, the graph of the activity history is analyzed to thereby obtain a tendency indicating the activity to be taken in a certain opportunity in a certain place at a certain time. That is, the user's tastes can be acquired. The graph of the activity history is stored, and the graph is analyzed to thereby analyze tastes by the taste analysis recording sub-module.

Similar history recording and taste analysis can be performed also with respect to a target level. The target history recording in the target level is performed by a user target analysis recording module 314 disposed in a target detection evaluation module 31. This module also comprises a target history recording sub-module and a taste analysis recording sub-module of a target level (not shown either).

An example where this configuration is used will be described hereinafter.

EXAMPLE 1

Restaurant Navigation

A target detection module 311 detects a desire to have a meal as the user's desire.

An activity history recording sub-module is disposed in the user activity analysis module 324, and the history of activities performed by the user in the past is stored in the form of activity history. Moreover, the user's activity history or a relation of an activity history group is analyzed, and stored as the user's tastes by the taste analysis recording sub-module. This module analyzes the user's activities in accordance with the user's TPOs over a long period, and stores the analysis into a database.

The activity plan evaluation module 32 constantly monitors an activity plan and a reaction result by the user. Moreover, for example, as the TPO concerning the activity, information of the user's present location is obtained from an external sensor, and information of present time or the like is obtained from a time sensor. A restaurant candidate desired by the user is selected using the user's present location, activity history recording sub-module, taste analysis recording sub-module, and map database (this map database may be disposed in either the user activity analysis module 324 or the outside). For example, as a specific example, the activity plan module 321 first searches the activity history group already stored in the activity history recording sub-module for the following:

(1) an activity history group indicating a meal the user had in a similar state at a similar time; and (2) an activity history group concerning types of the meals in the activity history taken these several days. Moreover, when the information is searched concerning the cause/effect relation or cooccurrence relation of activity histories (1) and (2) from the taste analysis recording sub-module, an activity plan (Japanese restaurant, Italian restaurant, American restaurant, Chinese restaurant, etc., in a restaurant category which meets the user's tastes) including the user's tastes is made. Furthermore, a specific restaurant candidate is inquired in accordance with the user's present TPO via communication (radio communication or Internet communication) from the external sensor. Thus, restaurant candidates which meet the user's tastes and which are located near the user's present location are given priorities and listed. When restaurant atmosphere, meal menu and the like are further taken into consideration, restaurants which further meet the user's tastes can be limited from the restaurant candidates obtained as a result of the inquiry. In this case, vacancy information or the like of the restaurant can also be provided.

The candidates are displayed in the user information providing device 20. When the user selects one restaurant from the candidates, a route plan (activity plan) to the restaurant is prepared. A reservation is made with respect to the restaurant.

In this case, information to be transmitted to the restaurant is minimum information on the reservation, such as individual names, telephone number, the number of persons for the reservation, and smoking/non-smoking. When the restaurant requires another information (e.g., the number of children, necessity of a handicapped chair), another private information having confidentiality level capable of managing information security is transmitted from the user activity support agent 30 in response to a request during the reservation. That is, privacy and security can be controlled in such a manner as to prevent outflow of private information as far as possible.

Moreover, the user reaction evaluation module 323 successively monitors whether or not this plan is executed (in the same manner as in the above-described example). The successively monitored information is provided in the user information providing device 20. It is to be noted that the information may be superimposed/displayed upon an original image.

EXAMPLE 2

Private Data Storage and Individual Authentication

As described above, the user support apparatus records the information, activity history, or taste inherent in the user to thereby support the user's activity. Therefore, the information inherent in the user is stored in a memory or a storage device detachable from the user support apparatus, for example, user ID number, user name, user address, user telephone number, user activity history described in the above example, and user taste information. Thus, the information inherent in the user, or the information on activity history or taste inherent in the user can be stored in the detachable storage device. Therefore, when a plurality of users use the user support apparatus, this detachable storage device may only be changed. Hardware of the user support apparatus is easily shared, and version upgrade of the apparatus is also facilitated.

Furthermore, when the user utilizes the user support apparatus, the apparatus performs predetermined individual collation with respect to the user in such a manner that the user can use the support apparatus only in agreement of a result of the individual collation with respect to the user. When the individual authentication is performed, security of user information can be protected because the user support apparatus sometimes include the information associated with the specific user, activity history, or taste information. Furthermore, since the individual collation is utilized, leakage of the information to the other people can be prevented.

Additionally, the user individual collation can be realized when using at least one sensor in the sensor group 10 attached to the user support apparatus. A sensor only for the individual authentication does not have to be added, the sensor group 10 can be effectively used, and the number of components of the sensor group can be decreased. As the sensor, various types of biometrics can be used such as face authentication by the camera sensor shown in FIG. 5, voice authentication by a microphone sensor, and vital sign authentication by a vital sign sensor. For example, in the voice authentication, a password may be pronounced by the user.

EXAMPLE 3

Stimulus Information Presentation

When a user has a target of collecting general information (e.g., trivial information), a target detection evaluation module 31 detects the target, and thereafter communicates with the sensor group 10 disposed in the external environment or a server group disposed in a local district, so that information in which the user is interested can be obtained.

Moreover, to obtain the information which may interest the user, it is important to obtain the user's introspective information (e.g., mood, atmosphere, degree of excitement, etc.). In this case, a vital sign sensor (e.g., heart rate sensor or perspiration sensor) which measures the user's excited state, a portable electroencephalogram sensor or the like may be used as the sensor group 10. For example, depending on the user's awakened degree, the trivial information configuring stimulus is presented to the user to awaken the user. Alternatively, when the user feels tired, music or video is provided in accordance with the TPO to give comfort to the user.

EXAMPLE 4

Example of Memory Recording

In a case where the user's desire is memory recording, an image, video, voice or the like is stored which records an event for the user on the day, for example, from images captured by a camera module into the activity history recording sub-module based on estimation of the taste analysis recording sub-module in the user activity analysis module 324. In this case, as described in the above example, it is also possible to index (label) activity recordings utilizing the sensor group 10 which detects the user's introspective information. For example, when the heart rate sensor or the perspiration sensor is used as the vital sign sensor attached to the user, the user's excitement or interest associated with a certain video is measured. Moreover, a part of the image or video is recorded as the event at that time by the information. When the image or video recorded in this manner is analyzed, characteristic information of an object (e.g., person, building, character or color of sign) detected from the image may be given as a keyword. When the keyword added in this manner is recorded together with the image, video and the like, the recording is also possible with respect to the activity history recording sub-module. The image, video or the like recorded in this manner can be searched by the keyword or the like by the user's instruction.

Furthermore, since the information recorded in this manner is the user's private information, the information disclosure degree is applied as described in the second embodiment, and accordingly the information can be disclosed only to a specific user.

As described above, according to the user support apparatus of the third embodiment of the present invention, a more personal target can be detected based on the analysis of the user's tastes. A more personal activity plan can be made based on the analysis of the user's tastes. Furthermore, the user's feelings can be exactly acquired, and the user's experience can be sensed.

Moreover, the information inherent in the user, the activity history inherent in the user, or the information on the taste inherent in the user can be stored in the detachable storage device. Therefore, in a case where a plurality of users utilize the user support apparatus, the detachable storage device may only be changed to realize the use. The hardware of the user support apparatus is easily shared, and the version upgrade of the apparatus is also facilitated.

Moreover, since the user support apparatus sometimes includes the information associated with the specific user, activity history, or taste information, it is possible to protect the security of the user information by the use of the individual collation, and further the leak of the information to the others can be prevented. Furthermore, a sensor for the individual authentication only does not have to be added, the sensor group is effectively used, and the number of components can be reduced.

Fourth Embodiment

In a fourth embodiment, a user reaction evaluation module 323 selects a sensor output required for monitoring each activity planned by an activity plan module 321, and defines a small activity (or motion or small target) which can be verified by the sensor output to verify the execution of the small activity.

Although not especially shown, specifically a user support apparatus according to the fourth embodiment of the present invention comprises a problem setting sub-module and a problem execution verification sub-module. Here, the problem setting sub-module selects a sensor, and sets a problem to be monitored by the selected sensor in such a manner that the activity can be monitored by the sensor. The problem execution verification sub-module monitors (verifies) whether or not the problem is actually executed with the selected sensor.

For example, when a small target of pressing an elevator button is defined as user's action, to verify that the button is pressed, the stereo camera is selected as the sensor from a sensor group 10, and two problems are set: (1) it verifies that the user actually presses the elevator button with user's finger/thumb; (2) it verifies, by a change of a sign in the button, that the button has been pressed. The problems are set in such a manner as to verify whether problem (2) or the problems (1) and (2) have been achieved using the images captured by the stereo camera. When the problem setting sub-module sets the problem, the problem execution verification sub-module monitors the execution actually using the stereo camera. This condition is shown in FIGS. 6 and 7.

As described above, according to the user support apparatus of the fourth embodiment of the present invention, the required sensor can be selected from the sensor group.

Fifth Embodiment

In a fifth embodiment, a plurality of targets are simultaneously or non-simultaneously defined. In this case, a degree of progress with respect to the target is monitored (evaluated) synchronously or asynchronously by a user reaction evaluation module 323.

That is, when a user designates a plurality of targets as shown in FIG. 16, user activity support agents 30-1, 30-2, . . . 30-n support user's activity while monitoring activity situations with respect to the targets in parallel. In this case, each of the user activity support agents 30-1, 30-2, . . . 30-n may comprise an input information security control module 33 and an output information security control module 34 as in the second embodiment. Alternatively, an input side and an output side are integrated, respectively, and an input security control module 41 and an output security control module 42 may be independently disposed.

Figure 17:
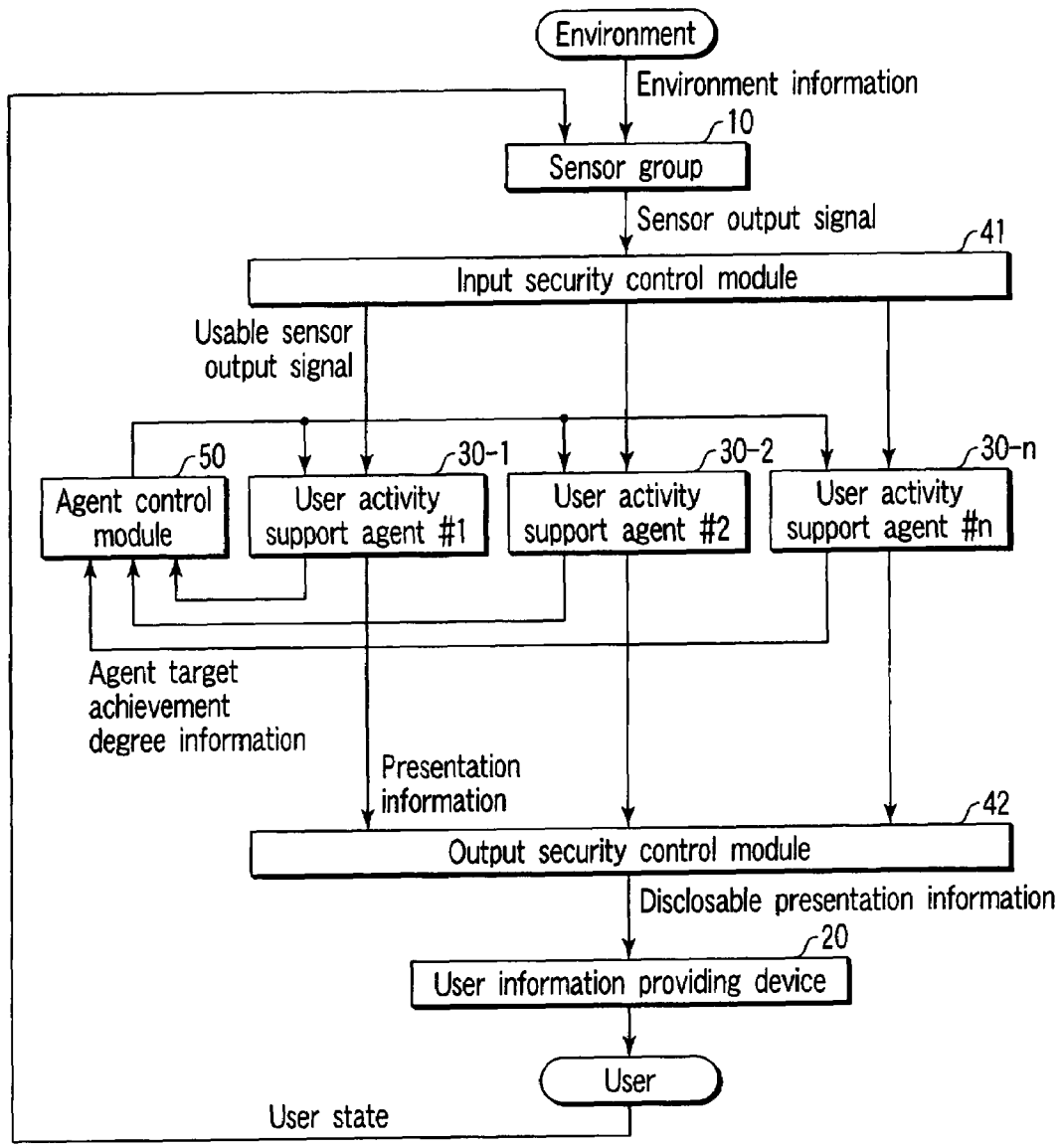
FIG. 17 is a diagram showing a configuration of modification of the user activity support apparatus according to the fifth embodiment.

Moreover, as shown in FIG. 17, an agent control module 50 may be further disposed which controls a plurality of targets. For example, in a case where a restaurant guide described in the second embodiment is used as one agent to support the activity, and a memory recording agent described in the third embodiment is simultaneously executed, the operation of the restaurant-guide agent is regarded as a high priority and controlled. The agent for recording the image or video operates as a control system which is processed, for example, in a wearable computer during the process of the restaurant-guide agent.

When the priority is not applied in this manner, the agent control module 50 can command the respective user activity support agents 30-1, 30-2, . . . 30-n in such a manner that the operation executed by the agent is executed in a certain timing cycle.

By the use of the above-described system, the user activity support capable of handling a plurality of user's targets is realized, and an agent system capable of handling any complicated situation is also realized.

As described above, according to the user support apparatus of the fifth embodiment of the present invention, information presentation or activity planning is performed with respect to not only a single target but also a plurality of targets. Accordingly, the activity support can be performed more suitably for the user, and it is possible to simultaneously satisfy the processes for the plurality of targets. By the application of the priority among the processes for the plurality of targets, priority can be given to important target achievement.

Sixth Embodiment

Next, specific information providing examples will be described as a sixth embodiment of the present invention in the user information providing device 20 of the first to fifth embodiments.

For example, the small display 22 which is the user information providing device 20 contained in the eyeglass-type sensor group shown in FIGS. 4A and 4B can be configured as a screen 811 shown in FIG. 18A. Here, the screen 811 displays an @ mark 812, an N mark 813, upper-lower and left-right segments 814A to 814D, and a contents display unit 815 surrounded with the segments 814A to 814D. The upper-lower and left-right segments 814A to 814D indicate front, back, left and right of the user, respectively, and are lit/displayed in such a manner as to indicate a direction of an object or state forming information to be displayed in the contents display unit 815 with respect to the user. In this case, when lit/displayed colors of the segments 814A to 814D are changed, a type of information displayed in the contents display unit 815 can be represented. For example, a red display 816 indicates information which arouses the user's attention, and a green display indicates friendly information.

Moreover, the information is provided in the contents display unit 815, and sound information on displayed information contents is output from a speaker 21 which is the user information providing device 20 contained in the eyeglass-type sensor group, for example, "car is coming from right". The information can be provided in this manner. It is to be noted that the approaching of this car is extracted from the information acquired from the sensor group 10. For example, when the user takes a taxi during navigation to a restaurant, as shown in FIG. 18B, the user's attention can be attracted.

Moreover, when there is a visual line detection sensor as the sensor contained in the eyeglass-type sensor group, the @ mark 812 and the N mark 813 can be used as interface signs. For example, when the user's eyes are focused for three seconds, this is detected by the visual line detection sensor, "YES" can be selected with the @ mark 812, and "NO" can be selected with the N mark 813. That is, FIG. 18B shows an information providing example in which an a free taxi is approaching from a direction (right direction) shown by a green display 817. When the user gazes at the @ mark 812 for three or more seconds in response to the information providing, the @ mark 812 is lit/displayed in green. That is, in response to the provided information, the user declares intention "YES". The user reaction evaluation module 323 can estimate whether or not the information provided with respect to the user is useful information for the user. Moreover, when the result is stored in the user activity analysis module 324, a possibility that unnecessary information is provided with respect to the user can be reduced.

Figure 19A:
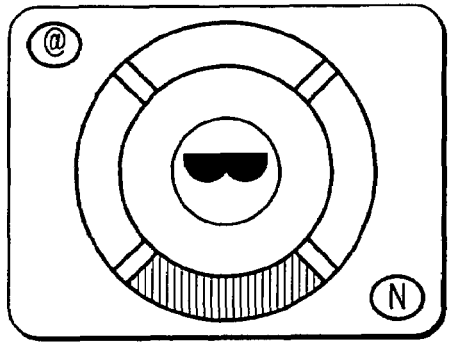
FIG. 19A is a diagram showing a specific information providing example in a case where an unknown person comes after a user for a predetermined time or a predetermined distance in the user support apparatus according to the sixth embodiment.
Figure 19B:
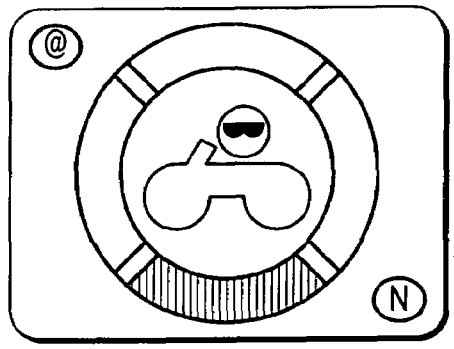
FIG. 19B is a diagram showing a specific information providing example in a case where an unknown bike comes after the user for the predetermined time or the predetermined distance in the user support apparatus according to the sixth embodiment.
Figure 19C:
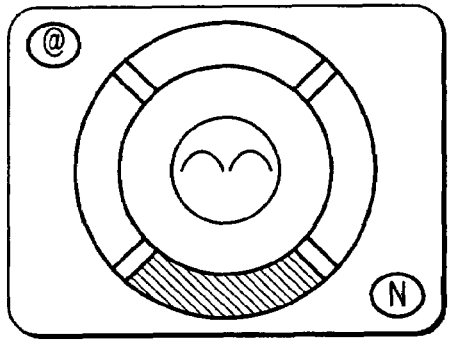
FIG. 19C is a diagram showing a specific information providing example in a case where a known person comes after the user for the predetermined time or the predetermined distance in the user support apparatus according to the sixth embodiment.
Figure 19D:
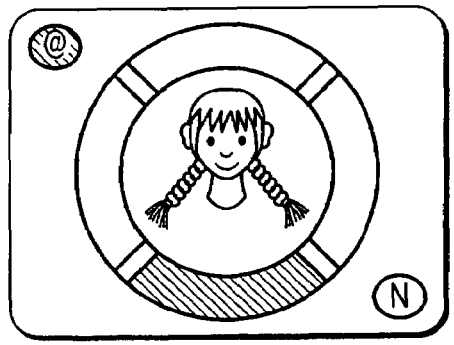
FIG. 19D is a diagram showing another specific information providing example in a case where the known person comes after the user for the predetermined time or the predetermined distance in the user support apparatus according to the sixth embodiment.

FIGS. 19A and 19B shows examples in which a dangerous object, a dangerous obstacle or the like around the user is detected as the user's target to thereby support the user's safe walking. These are information providing examples from the information acquired by the sensor group 10 in a case where an unknown person or motorcycle follows the user for a predetermined time or by a predetermined distance. On the other hand, when an activity history indicating that the user has seen the person is left in the activity history recording sub-module in the user activity analysis module 324, information is provided as shown in FIG. 19C or 19D. Needless to say, when the person is recorded as a person who has given discomfort to the user in the stored activity recording, the segment is displayed in red.

Figure 20:
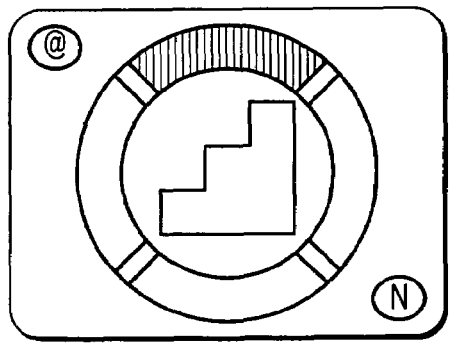
FIG. 20 is a diagram showing a specific information providing example in a case where user's attention is aroused in the user support apparatus according to the sixth embodiment.

Moreover, it is possible to provide the information which arouses the user's attention from information acquired by the activity plan evaluation module 32 not only from a moving object but also a signal from the sensor group 10 as shown in FIG. 20.

Figure 21A:
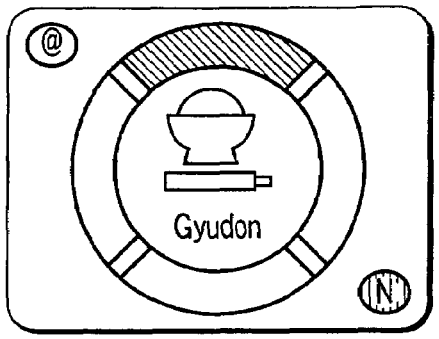
FIG. 21A is a diagram showing a specific information providing example in a case where navigation is performed in the user support apparatus according to the sixth embodiment.
Figure 21B:
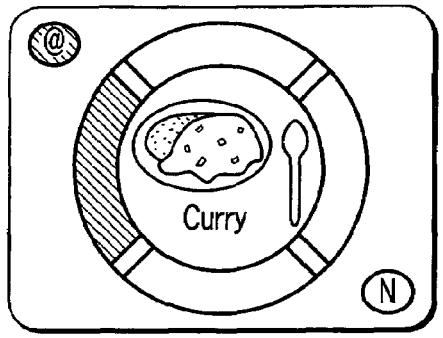
FIG. 21B is a diagram showing another specific information providing example in a case where the navigation is performed in the user support apparatus according to the sixth embodiment.
Figure 21C:
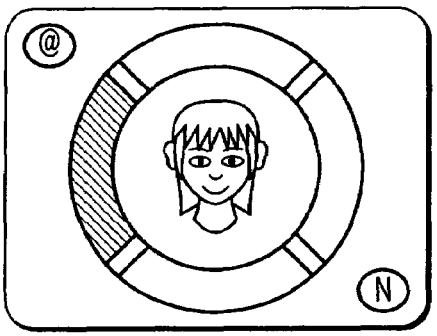
FIG. 21C is a diagram showing still another specific information providing example in a case where the navigation is performed in the user support apparatus according to the sixth embodiment.

When the user's target is navigation to a specific shop (e.g., curry restaurant) for seeing a specific person (e.g., Hanako), information may be provided as shown in FIGS. 21A and 21B. In this case, Hanako is found beforehand from those who are in the curry restaurant, for example, by the information from the sensor group 10 disposed in the curry restaurant, and the information can be provided as shown in FIG. 21C, while performing information security control.

Figure 22:
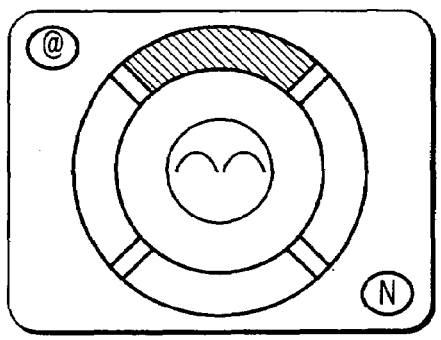
FIG. 22 is a diagram showing a specific information providing example at a time when a known person is identified in the user support apparatus according to the sixth embodiment.
Figure 22:
Figure 22:
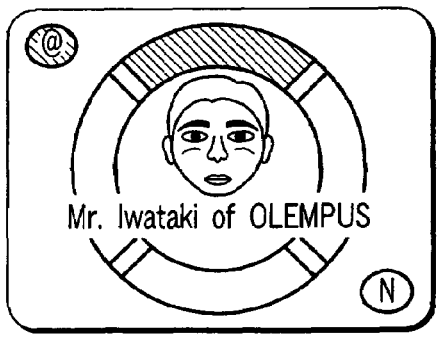

Moreover, as to the known person, instead of either information providing in FIGS. 19C and 19D, information contents to be provided may be changed in time series as shown in FIG. 22, and accordingly the information can be provided more effectively.

The present invention has been described with reference to the above-described embodiments, but the present invention is not limited to the above-described embodiments, and, needless to say, various modifications or applications are possible within the scope of the present invention. For example, in the above-described embodiments, the user is human, but the user may be not only a human but also an intelligent robot and a mobile object like a vehicle such as a car or a train.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A wearable computing device comprising: a first sensor group configured to enable a user to input desired content; a second sensor group configured to detect user environment information including at least one of a user's activity state and environment situation at a present position of the user; a user information providing device configured to provide the user with one of an instruction for the user to take an action and collateral information for use in determining the action, said one of the instruction and the collateral information being provided for realizing both the input desired content which is input by the first sensor group and determined based on the user environment information detected by the second sensor group and a user activity support agent configured to produce information to be provided in the user information providing device based on both the input desired content input by the first sensor group and the user environment information detected by the second sensor group, and to provide one of the instruction and the collateral information, thereby supporting the user's activity, wherein the user activity support agent includes: a target detection evaluation module configured to set as a physical target destination, both the input desired content which is input by the first sensor group and the determined desired content which is determined based on the user environment information detected by the second sensor group, such that the target destination is set as a final step in a flow comprising a plurality of steps defining an action necessary for achieving the target destination, and to provide the user with information for confirming whether or not the target destination is desired by the user via the user information providing device based on the outputs from at least one of the first and second sensor groups; and an activity plan evaluation module configured to plan the target destination determined as the desired target destination based on the user's reaction evaluated by the target detection evaluation module in such a manner as to realize the target destination by an activity group of the steps included in the flow to reach the target destination, based on the user environment information detected by the second sensor group, and to provide the user with a set of navigation directions for achieving the target destination and information suggesting the activity group via the user information providing device to perform at least one of monitoring and evaluation of an achievement degree with respect to the user's reaction to the information based on the user environment information detected by the second sensor group, and also to provide the user with information indicating a result of said at least one of the monitoring and evaluation.

2. The device according to claim 1, wherein the target detection evaluation module includes: a user reaction evaluation module configured to evaluate detection achievement degree of the target destination by the information of the target providing module, wherein an evaluation result of the user reaction evaluation module is fed back to the target detection evaluation module.

3. The device according to claim 2, wherein the target detection evaluation module further includes a user target analysis recording module configured to store a target history concerning the user's target destination using the target destination detected by the target detection evaluation module, the user's reaction evaluated by the user reaction evaluation module, and a usable sensor signal group obtained from at least one of the first and second sensor groups to model the user's tastes based on the target history, and the target detection evaluation module detects the user's target destination using at least one of the user's target history and taste information analyzed by the user target analysis recording module.

4. The device according to claim 1, wherein the activity plan evaluation module further includes a user activity analysis recording module configured to store an activity history concerning the user's activity using the information provided by the activity plan evaluation module, and a usable sensor signal group obtained from at least one of the first and second sensor groups to model the user's tastes based on the activity history, and the activity plan evaluation module plans the user's activity using at least one of the user's activity history and taste information analyzed by the user activity analysis recording module.

5. The device according to claim 1, further comprising: a security control module configured to control an information disclosure degree with respect to at least one of a signal from at least one of the first and second sensor groups and information to the user information providing device.

6. The device according to claim 1, wherein the user activity support agent comprising a plurality of units and processes a plurality of targets in parallel.

7. The device according to claim 6, further comprising: a control module configured to control priorities of the plurality of processes.

8. The device according to claim 1, wherein the at least one of the first and second sensor groups includes at least a sensor attached to an eyeglass-type frame, and at least one of the target detection evaluation module and the activity plan evaluation module uses information obtained by sensing at least one of the user and the user's surrounding environment corresponding to the user's observation view point by the sensor attached to the eyeglass type frame.

9. The device according to claim 1, wherein at least a part of at least one of the first and second sensor groups is attached to chest portion of the user, and at least one of the target detection evaluation module and the activity plan evaluation module uses information obtained by sensing the user's state by observation of at least the user's front and a part of the user's head by the part attached to the chest portion of the user.

10. The device according to claim 1, wherein at least one of the first and second sensor groups supports at least a part of a range which can be sensed by the user by at least one of the user's five senses, and acquires at least one of video, sound, smell, temperature, humidity, brightness, and ultraviolet ray amount which are sensed by the user.

11. The device according to claim 1, wherein at least one of the first and second sensor groups acquires at least one of acceleration, angular acceleration, speed, and gravity direction related to at least one of the user's posture and position, and detects at least one of the user's state and a relation between the user and the environment.

12. The device according to claim 1, wherein at least one of the first and second sensor groups includes a sensor configured to acquire a part of a range which is not caught in the user's view field as a video.

13. The device according to claim 1, wherein at least one of the first and second sensor groups includes at least one of a sensor and a beacon fixed beforehand in the environment.

14. The device according to claim 1, wherein the activity plan evaluation module selects an output of a sensor capable of measuring an achievement degree in order to measure the achievement degree of the activity planned by the activity plan module.

15. The device according to claim 1, further comprising a detachable storage device configured to store at least one of information inherent in the user, an activity history inherent in the user, and information on taste inherent in the user.

16. The device according to claim 1, wherein individual collation with respect to a predetermined user is performed, when the user is to use the apparatus, in such a manner that the user is permitted to use the user support apparatus only in agreement of a result of the user's individual collation.

17. The device according to claim 16, wherein the user's individual collation uses at least one sensor attached to the user support apparatus in at least one of the first and second sensor groups.

18. A user wearable computer device comprising: a first sensor group configured to enable a user to input desired content; a second sensor group configured to detect user environment information including at least one of a user's activity state and environment situation at a present position of the user; user information providing means for providing the user with one of an instruction for the user to take an action and collateral information for use in determining the action, said one of the instruction and the collateral information being provided for realizing both the input desired content which is input by the first sensor group and determined desired content which is determined based on the user environment information detected by the second sensor group; and user activity support means for producing information to be provided in the user information providing means based on both the input desired content input by the first sensor group and the user environment information detected by the second sensor group ,and to provide one of the instruction and the collateral information to support the user's activity wherein the user activity support means includes: target detection evaluation means for setting as a physical target destination, both the input desired content which is input by the first sensor group and the determined desired content which is determined based on the user environment information detected by the second sensor group, such that the target destination is set in the form of a final step in a flow comprising a plurality of steps defining an action necessary for achieving the target destination, and for providing the user with information for confirming whether or not the target destination is desired by the user reaction to the information providing means to evaluate the user's reaction to the information based on the outputs from at least one of the first and second sensor groups; and activity plan evaluation means for planning the target destination determined as the desired target destination based on the user's reaction evaluated by the target detection evaluation means in such a manner as to realize the target destination by an activity group of the steps including in the flow to reach the target destination, based on the user environment information detected by the second sensor group, and for providing the user with information suggesting the activity group via the user with information providing means to perform at least one of monitoring and evaluation of an achievement degree with respect to the user's reaction to the information based on the user environment information detected by the at least one sensor group, and also for providing the user with a set of navigation directions for achieving the target destination and information indicating a result of said second of the monitoring and evaluation.

* * * * *

UNITED STATES PATENT AND TRADEMARK OFFICE
CERTIFICATE OF CORRECTION

| | | |
|---|---|---|
| PATENT NO. | : 7,584,158 B2 | Page 1 of 1 |
| APPLICATION NO. | : 11/134763 | |
| DATED | : September 1, 2009 | |
| INVENTOR(S) | : Hidekazu Iwaki et al. | |

It is certified that error appears in the above-identified patent and that said Letters Patent is hereby corrected as shown below:

On the title page:

Under Item (73) Assignee;

change "Olympuc Corporation, Tokyo (JP)" to --Olympus Corporation, Tokyo (JP)--.

Signed and Sealed this

Twentieth Day of April, 2010

David J. Kappos
*Director of the United States Patent and Trademark Office*